United States Patent
Bessho et al.

(10) Patent No.: US 9,608,499 B2
(45) Date of Patent: Mar. 28, 2017

(54) ROTARY ELECTRIC MACHINE WITH A PAIR OF INTERFITTING PORTIONS, ROTARY ELECTRIC MACHINE STATOR, AND ROTARY ELECTRIC MACHINE STATOR MANUFACTURING METHOD

(71) Applicant: Mitsubishi Electric Corporation, Chiyoda-ku, Tokyo (JP)

(72) Inventors: Tomohiro Bessho, Chiyoda-ku (JP); Ryuji Kitamura, Chiyoda-ku (JP); Katsunari Takagi, Chiyoda-ku (JP); Masaya Inoue, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 350 days.

(21) Appl. No.: 14/253,278

(22) Filed: Apr. 15, 2014

(65) Prior Publication Data
US 2015/0155760 A1    Jun. 4, 2015

(30) Foreign Application Priority Data
Nov. 29, 2013 (JP) ................. 2013-247020

(51) Int. Cl.
*H02K 11/00* (2016.01)
*H02K 3/52* (2006.01)
*H02K 11/25* (2016.01)

(52) U.S. Cl.
CPC ......... *H02K 11/0047* (2013.01); *H02K 3/522* (2013.01); *H02K 11/25* (2016.01); *Y10T 29/49009* (2015.01)

(58) Field of Classification Search
CPC .... H02K 11/0047; H02K 11/25; H02K 3/522; H02K 3/46; Y10T 29/49009
USPC ....................................................... 310/68 C
See application file for complete search history.

(56) References Cited

U.S. PATENT DOCUMENTS 4,112,405 A * 9/1978 Joseph ................... H02K 11/25
                                                      310/68 C

FOREIGN PATENT DOCUMENTS

| CN | 101682236 A | 3/2010 |
| JP | 2010-252508 A | 11/2010 |
| JP | 5019960 B2 | 9/2012 |
| JP | 2012217303 A | 11/2012 |
| JP | 2013-013191 A | 1/2013 |

(Continued)

OTHER PUBLICATIONS

Machine translation of JP 2013158078 A (Aug. 2013).*

(Continued)

*Primary Examiner* — Michael Andrews
(74) *Attorney, Agent, or Firm* — Sughrue Mion, PLLC; Richard C. Turner (57) ABSTRACT

An insulator includes: a trunk portion that is interposed between a tooth and a stator coil; and a first flange portion that is disposed on the trunk portion so as to be adjacent to the stator coil in a radial direction of a stator core. A notch portion is disposed on a flange protruding portion of the first flange portion that protrudes from the stator core in the axial direction of the stator core from an outer circumferential portion of the flange protruding portion toward the trunk portion. A holder that has a holder main body that is disposed on the notch portion is mounted onto the flange protruding portion. A temperature sensor is held between the holder main body and the stator coil.

8 Claims, 7 Drawing Sheets

(56) References Cited

FOREIGN PATENT DOCUMENTS

| JP | 201351806 A | | 3/2013 | | |
| JP | 2013051806 A | * | 3/2013 | ............. | H02K 11/00 |
| JP | 2013158078 A | * | 8/2013 | ............... | H02K 3/34 |

OTHER PUBLICATIONS

Machine translation of JP 2013051806 A (Mar. 2013).*
Communication dated Dec. 16, 2014, from the Japanese Patent Office in counterpart application No. 2013-247020.
Communication dated Sep. 5, 2016 from the State Intellectual Property Office of the P.R.C. in counterpart Application No. 201410286772.6.

* cited by examiner

ROTARY ELECTRIC MACHINE WITH A PAIR OF INTERFITTING PORTIONS, ROTARY ELECTRIC MACHINE STATOR, AND ROTARY ELECTRIC MACHINE STATOR MANUFACTURING METHOD

BACKGROUND OF THE INVENTION

1. Field of the Invention

The present invention relates to a rotary electric machine, a rotary electric machine stator, and a rotary electric machine stator manufacturing method that can be used as at least one of a motor and an alternator in electric vehicles (EVs), or hybrid electric vehicles (HEVs), for example.

2. Description of the Related Art

Conventionally, in order to measure temperature of stator coils that are disposed on teeth of a stator core, motors are known in which a temperature sensor that is inserted between two mutually circumferentially adjacent stator coils is held in a holder, and the temperature sensor is placed in contact with at least one of the two stator coils (see Patent Literature 1).

Conventionally in order to measure temperature of stator coils, motor stators are also known in which a sensor chamber is disposed on a flange that is disposed so as to stand on a trunk that is mounted onto teeth of a stator core, a temperature sensor is housed in the sensor chamber, and the temperature sensor is placed in contact with the stator coils through an opening in the sensor chamber. The sensor chamber that houses the temperature sensor is disposed between a core back and the stator coils of the stator core (see Patent Literature 2).

In addition, motors are also conventionally known in which a temperature sensor is inserted into a groove that is disposed on a surface of a flange portion of an insulator near stator coils, and temperature of the stator coils is measured by placing the temperature sensor in contact with the stator coils. The temperature sensor is disposed between a core back and the stator coils of the stator core (see Patent Literature 3).

CITATION LIST

Patent Literature

[Patent Literature 1]
  Japanese Patent Laid-Open No. 2010-252508 (Gazette)
[Patent Literature 2]
  Japanese Patent Laid-Open No. 2013-013191 (Gazette)
[Patent Literature 3]
  Japanese Patent No. 5019960 (Gazette)

SUMMARY OF THE INVENTION

However, in the conventional motor that is disclosed in Patent Literature 1, because the temperature sensor is inserted between two stator coils, space in which the stator coils should be disposed is occupied by the temperature sensor, reducing the stator coil space factor. Furthermore, contact failure of the temperature sensor on the stator coils is more likely to occur due to irregularities in stator coil wire diameter and stator coil arrangement, etc.

In the conventional motor stator that is shown in Patent Literature 2, because the temperature sensor is disposed between the core back and the stator coils, stator coil space factor is reduced. In addition, because it is necessary to wind the conducting wires of the stator coils onto the teeth with the temperature sensor housed in the sensor chamber of the insulators, it is difficult to perform adjustment that makes the temperature sensor contact the stator coils after the conducting wires of the stator coils are wound onto the teeth, making contact failure of the temperature sensor on the stator coils more likely to occur.

In addition, in the conventional motor stator that is shown in Patent Literature 3, because the temperature sensor is disposed between the core back and the stator coils, stator coil space factor is reduced. Furthermore, contact failure of the temperature sensor on the stator coils is more likely to occur due to irregularities in stator coil wire diameter and stator coil arrangement, etc.

The present invention aims to solve the above problems and an object of the present invention is to provide a rotary electric machine, a rotary electric machine stator, and a rotary electric machine stator manufacturing method that can prevent reductions in stator coil space factor, and that enable a temperature sensor to be placed in contact with a stator coil more reliably.

In order to achieve the above object, according to one aspect of the present invention, there is provided a rotary electric machine and a rotary electric machine stator including: a stator core that includes: a core back; and a tooth that protrudes in a radial direction from the core back; a stator coil that is disposed on the tooth; an insulator that includes: a trunk portion that is interposed between the tooth and the stator coil; and a flange portion that is disposed on the trunk portion so as to be adjacent to the stator coil in a radial direction of the stator core, a notch portion being disposed on a flange protruding portion toward the trunk portion from an outer circumferential portion of the flange protruding portion, the flange protruding portion being a portion of the flange portion that protrudes from the stator core in an axial direction of the stator core; a holder that is mounted onto the flange protruding portion, the holder including a holder main body that is disposed in the notch portion; and a temperature sensor that is held between the holder main body and the stator coil.

According to another aspect of the present invention, there is provided a rotary electric machine stator manufacturing method including: a winding step in which an insulator that includes a trunk portion and a flange portion that is disposed on the trunk portion is mounted onto a tooth of a stator core such that a notch portion on a flange protruding portion that is a portion of the flange portion that protrudes from the stator core in an axial direction of the stator core is disposed from an outer circumferential portion of the flange protruding portion toward the trunk portion, and then a stator coil is disposed on the tooth so as to have the trunk portion interposed; a temperature sensor inserting step in which a temperature sensor is inserted into the notch portion after the winding step; and a holder mounting step in which a holder main body of a holder is inserted into the notch portion to mount the holder onto the flange protruding portion while holding the temperature sensor between the stator coil and the holder main body after the temperature sensor inserting step.

A rotary electric machine, a rotary electric machine stator, and a rotary electric machine stator manufacturing method according to the present invention can prevent reductions in stator coil space factor and enable a temperature sensor to be placed in contact with a stator coil more reliably.

DETAILED DESCRIPTION OF THE PREFERRED EMBODIMENTS

Preferred embodiments of the present invention will now be explained with reference to the drawings.

Embodiment 1

Figure 1:
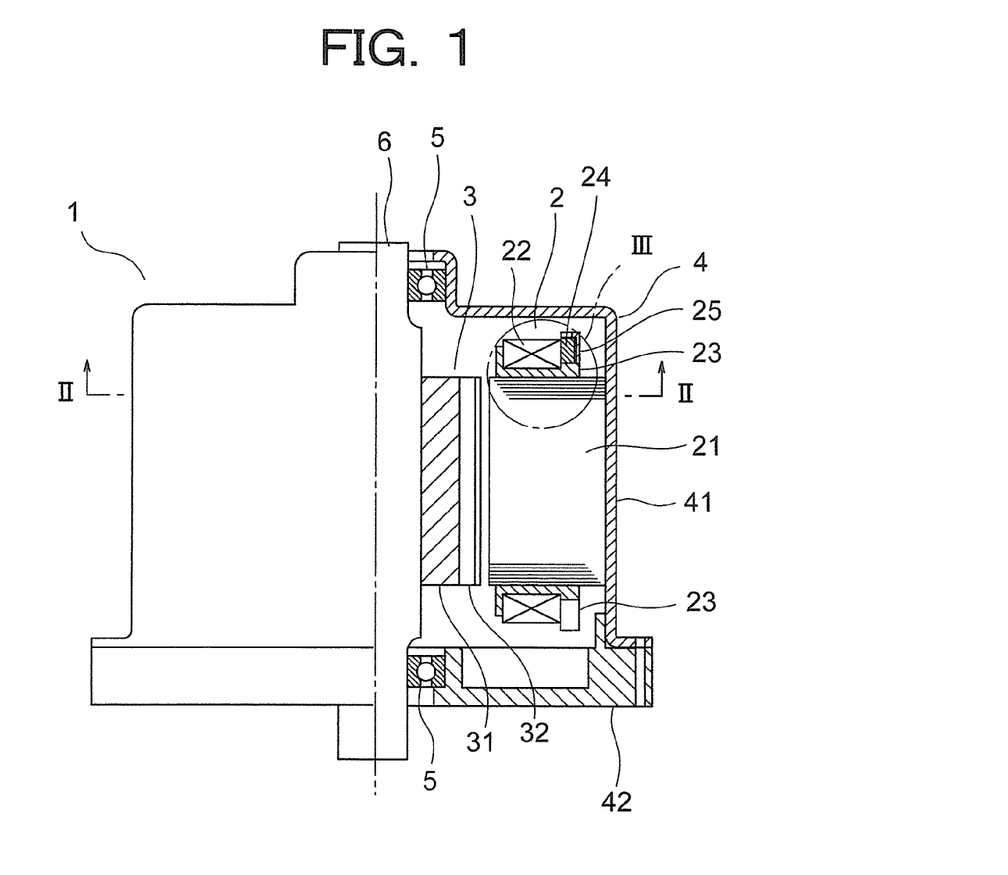
FIG. 1 is a longitudinal half section that shows a rotary electric machine according to Embodiment 1 of the present invention.
Figure 2:
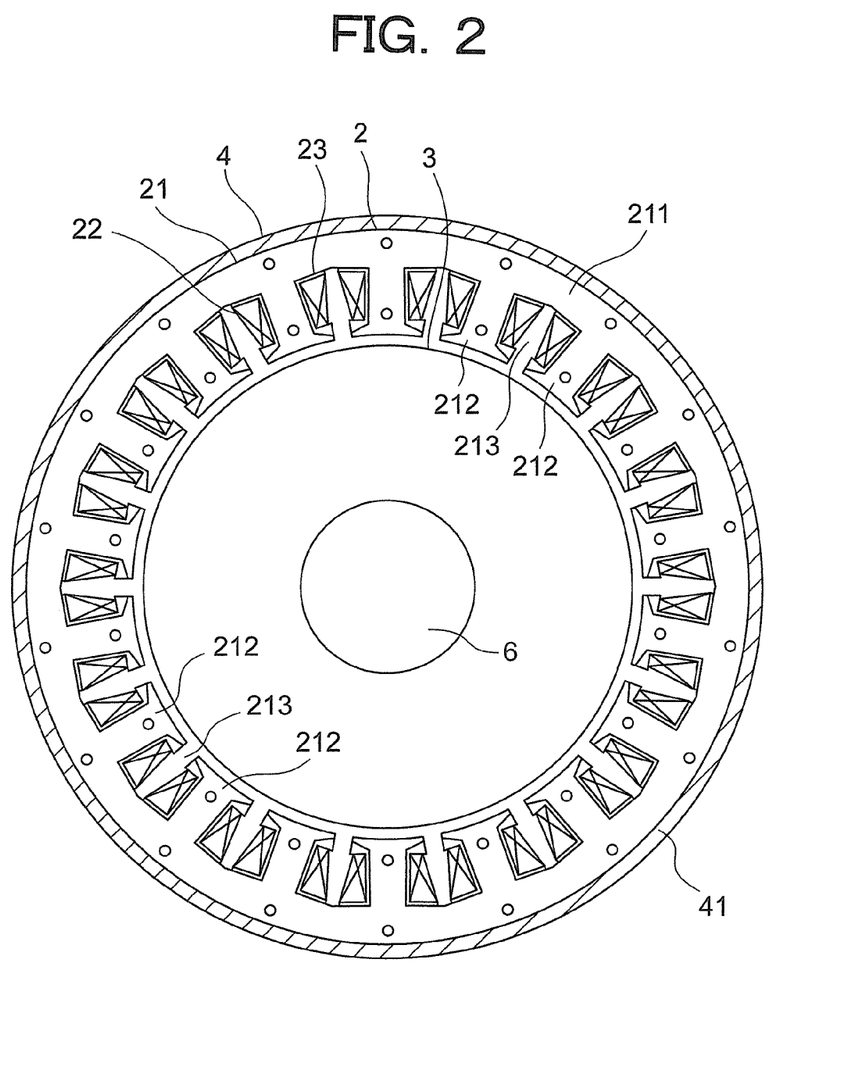
FIG. 2 is a cross section that is taken along Line II-II in FIG. 1.

FIG. 1 is a longitudinal half section that shows a rotary electric machine according to Embodiment 1 of the present invention. FIG. 2 is a cross section that is taken along Line II-II in FIG. 1. In the figures, a rotary electric machine 1 has: a tubular stator 2; a rotor 3 that is disposed inside the stator 2 in a radial direction of the stator 2; and a housing 4 that supports the stator 2 and the rotor 3.

The housing 4 has: a cup-shaped first housing portion 41 in an internal portion of which the stator 2 and the rotor 3 are disposed; and a second housing portion 42 that covers an opening portion of the first housing portion 41. The stator 2 is fixed to an inner circumferential surface of the first housing portion 41.

A pair of bearings 5 are disposed on the housing 4. One of the pair of bearings 5 is disposed on the first housing portion 41, and the other is disposed on the second housing portion 42. A rotating shaft 6 is rotatably supported in the housing 4 by means of the pair of bearings 5. The rotating shaft 6 is disposed on an axis of the rotary electric machine 1 when passed through the first and second housing portions 41 and 42.

The rotor 3 is fixed to the rotating shaft 6. The rotor 3 is thereby rotated together with the rotating shaft 6 around the shaft axis of the rotary electric machine 1 relative to the stator 2. As shown in FIG. 1, the rotor 3 has: a cylindrical rotor core 31, which is a magnetic body, that is disposed so as to be coaxial with the rotating shaft 6; and a plurality of permanent magnets 32 that are fixed to the rotor core 31.

The stator 2 is disposed so as to be coaxial with the rotor 3. The stator 2 has: a stator core 21 that faces the rotor 3 in a radial direction of the rotor 3 so as to have a gap interposed; a plurality of stator coils 22 that are disposed on the stator core 21 so as to line up in a circumferential direction of the stator core 21; a plurality of insulators 23 that are disposed on the stator core 21 to ensure an insulated state of each of the stator coils 22 relative to the stator core 21; a temperature sensor 24 that is disposed on at least one of the insulators 23 to detect a temperature of the stator coils 22; and a holder 25 that is disposed on the insulator 23 to hold the temperature sensor 24 on the insulator 23.

The stator core 21 is a laminated body that is configured by laminating a plurality of magnetic sheets (steel sheets, for example) in an axial direction of the stator 2. As shown in FIG. 2, the stator core 21 has: a cylindrical core back 211 that is centered around a shaft axis of the stator 2; and a plurality of teeth 212 that each protrude radially inward from the core back 211, and that are disposed so as to be separated from each other in a circumferential direction of the core back 211. The stator coils 22 are respectively disposed on each of the teeth 212. Slots 213 in which the stator coils 22 are disposed are formed between each of the teeth 212.

Figure 3:
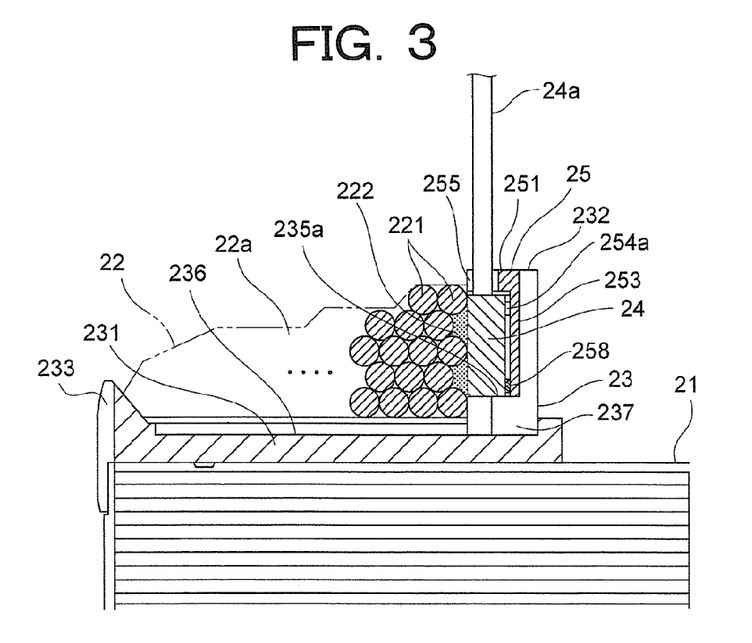
FIG. 3 is an enlargement that shows Portion III in FIG. 1.
Figure 4:
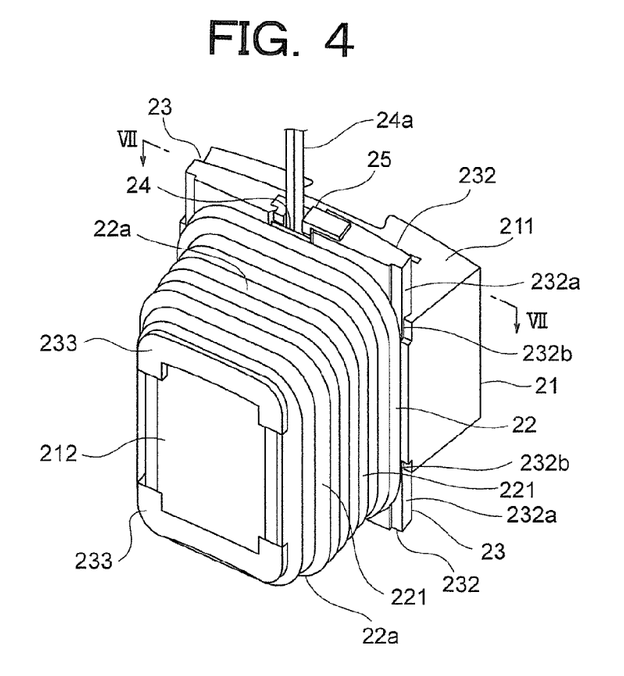
FIG. 4 is an enlarged oblique projection that shows a state in which a stator coil is disposed on a tooth from FIG. 2.

FIG. 3 is an enlargement that shows Portion III in FIG. 1. FIG. 4 is an enlarged oblique projection that shows a state in which a stator coil 22 is disposed on a tooth 212 from FIG. 2. As shown in FIG. 4, a pair of insulators 23 is fitted onto a common tooth 212 from two axial ends of the stator core 21. The stator coil 22 is disposed on the tooth 212 so as to have the pair of insulators 23 interposed.

The stator coil 22 is constituted by a conducting wire 221 that is wound onto the tooth 212 for a plurality of turns. A varnish is impregnated into the stator coil 22. The stator coil 22 and the insulator 23, and the turns of conducting wire 221, are thereby fixed together by the varnish. Portions of the stator coil 22 that protrude from the axial range of the stator core 21 form coil end portions 22a. The stator coil 22 is cooled by an insulating refrigerant that flows through the housing 4. Examples of such a refrigerant include oil or air, for example.

The insulators 23 are constituted by an electrically-insulating material (a resin, for example). Each of the insulators 23 has: a trunk portion 231 (FIG. 3) that is interposed between the stator coil 22 and the tooth 212; a first flange portion 232 that is disposed on an outer end portion of the trunk portion 231 in a radial direction of the stator core 21 (an end portion that is close to the core back 211); and a second flange portion 233 that is disposed on an inner end portion of the trunk portion 231 in the radial direction of the stator core 21 (an end portion that is close to the rotor 3).

The first flange portion 232 and the second flange portion 233 are flat portions that are disposed so as to stand on outer circumferential surfaces of the trunk portion 231. The stator coil 22 is disposed between the first flange portion 232 and the second flange portion 233. The first flange portion 232 and the second flange portion 233 are each adjacent to the stator coil 22 in the radial direction of the stator core 21. The position of the stator coil 22 relative to the insulator 23 is restricted in the radial direction of the stator core 21 by the first flange portion 232 and the second flange portion 233.

The first flange portion 232 has: a flange protruding portion (a thick portion) 232a that protrudes from the stator core 21 in the axial direction of the stator core 21; and a flange inserted portion (a thin portion) 232b that extends from the flange protruding portion 232a into the axial range of the stator core 21, and that is thinner than the flange protruding portion 232a. A stepped portion that fits over the core back 211 is formed at a boundary between the flange protruding portion 232a and the flange inserted portion 232b. A portion of the flange protruding portion 232a is thereby placed on the axial end surface of the core back 211, and the flange inserted portion 232b is inserted between the core back 211 and the stator coil 22. In other words, when the first flange portion 232 is viewed in the axial direction of the stator 2, a portion of the flange protruding portion 232*a* overlaps with the core back 211, and the flange inserted portion 232*b* is disposed between the core back 211 and the stator coil 22.

Figure 5:
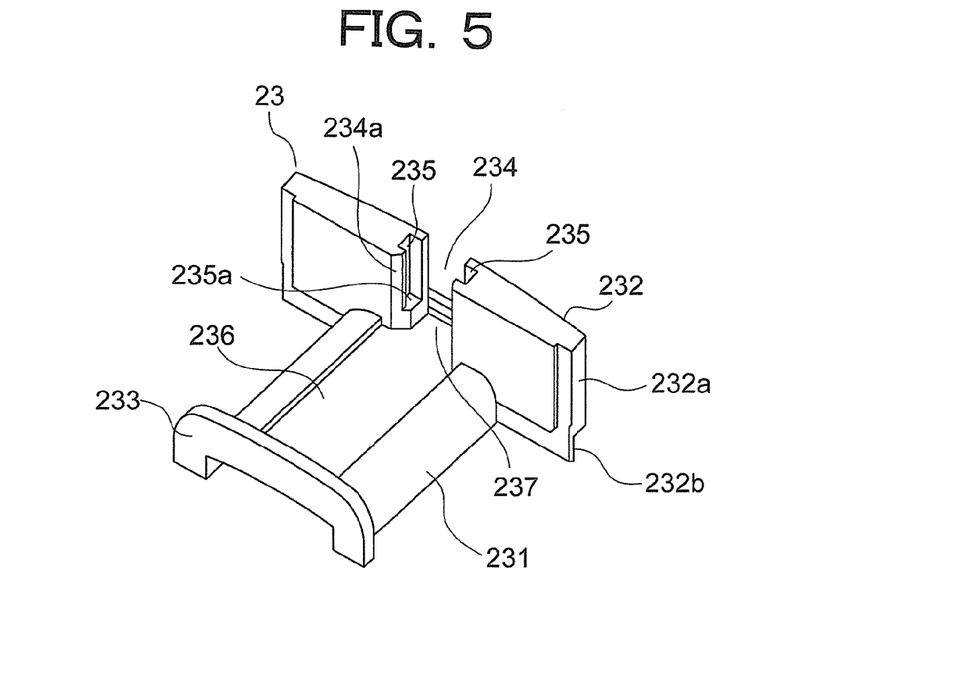
FIG. 5 is an oblique projection that shows a state when the insulator from FIG. 4 is viewed from a side near a second flange portion.
Figure 6:
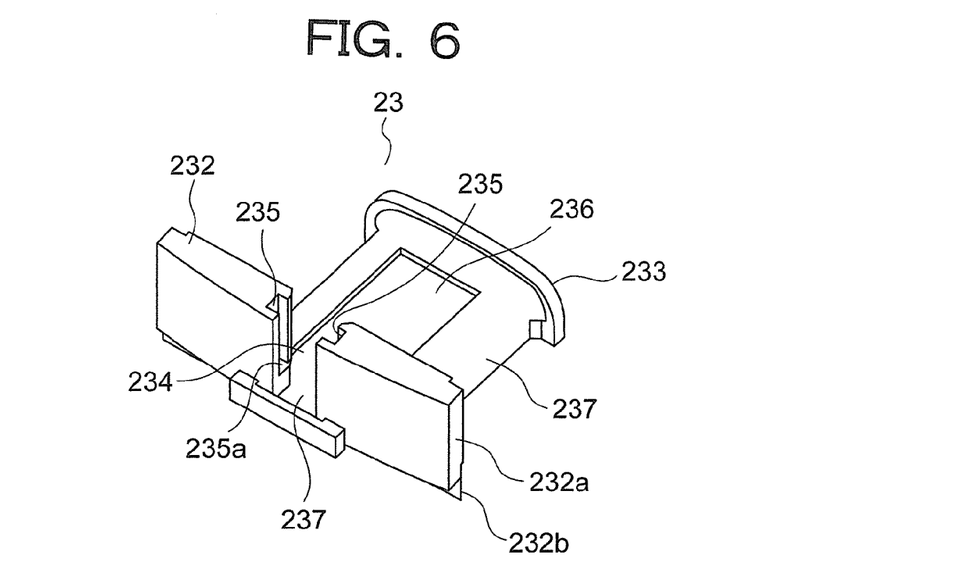
FIG. 6 is an oblique projection that shows a state when the insulator from FIG. 4 is viewed from a side near a first flange portion.

Now, FIG. 5 is an oblique projection that shows a state when the insulator 23 from FIG. 4 is viewed from a side near the second flange portion 233. FIG. 6 is an oblique projection that shows a state when the insulator 23 from FIG. 4 is viewed from a side near the first flange portion 232. A varnish supplying groove 236 that extends from the first flange portion 232 to the second flange portion 233 is disposed on an outer circumferential surface of the trunk portion 231. A communicating space 237 that passes through the flange protruding portion 232*a* in a thickness direction of the first flange portion 232 is disposed at a boundary between the outer circumferential surface of the trunk portion 231 and the flange protruding portion 232*a*. The communicating space 237 and the varnish supplying groove 236 are connected to each other. Thus, the varnish can be supplied to the stator coil 22 on the insulator 23 through the varnish supplying groove 236 from the communicating space 237.

A notch portion 234 is disposed on the flange protruding portion 232*a* from an outer circumferential portion of the flange protruding portion 232*a* toward the trunk portion 231. The notch portion 234 is a slit portion that passes through the flange protruding portion 232*a* in the thickness direction of the first flange portion 232, and that is open on an outer circumferential portion of the flange protruding portion 232*a*. In this example, the notch portion 234 is disposed parallel to the axial direction of the stator core 21 on the flange protruding portion 232*a*. Thus, in this example, a depth direction of the notch portion 234 is oriented in the axial direction of the stator core 21.

The notch portion 234 is connected to the communicating space 237. Thus, a space inside the varnish supplying groove 236 and spaces inside the communicating space 237 and the notch portion 234 form a mutually continuous integrated space.

A pair of interfitting grooves (interfitting portions) 235 are disposed on inner surfaces of the notch portion 234 so as to be parallel to the depth direction of the notch portion 234. The pair of interfitting grooves 235 face each other in a width direction of the notch portion 234. Thus, in this example, the pair of interfitting grooves 235 face each other in the circumferential direction of the stator core 21.

Each of the interfitting grooves 235 is open on the outer circumferential portion of the flange protruding portion 232*a*. Each of the interfitting grooves 235 extends from the outer circumferential portion of the flange protruding portion 232*a* to a boundary position between the notch portion 234 and the communicating space 237. A groove end surface 235*a* is formed on an end portion of each of the interfitting grooves 235 near the communicating space 237. In this example, the groove end surfaces 235*a* are formed so as to be perpendicular to longitudinal directions of the interfitting grooves 235.

Portions of the inner surfaces of the notch portion 234 that are closer to the stator coil 22 than each of the interfitting grooves 235 form a pair of inclined surfaces 234*a* that are inclined in opposite directions to each other relative to a surface of the flange protruding portion 232*a* near the stator coil 22. A width dimension of the notch portion 234 is widened toward the stator coil 22 by the pair of inclined surfaces 234*a*.

In this example, the temperature sensor 24 has a parallelepiped shape. As shown in FIG. 3, the temperature sensor 24 is disposed in the notch portion 234 such that a portion of the temperature sensor 24 is engaged in the groove end surfaces 235*a*. Lead wires 24*a* are connected to the temperature sensor 24. The lead wires 24*a* are led outside the notch portion 234 from the temperature sensor 24 through an open portion of the notch portion 234 that is positioned on an outer circumferential portion of the flange protruding portion 232*a*.

Figure 7:
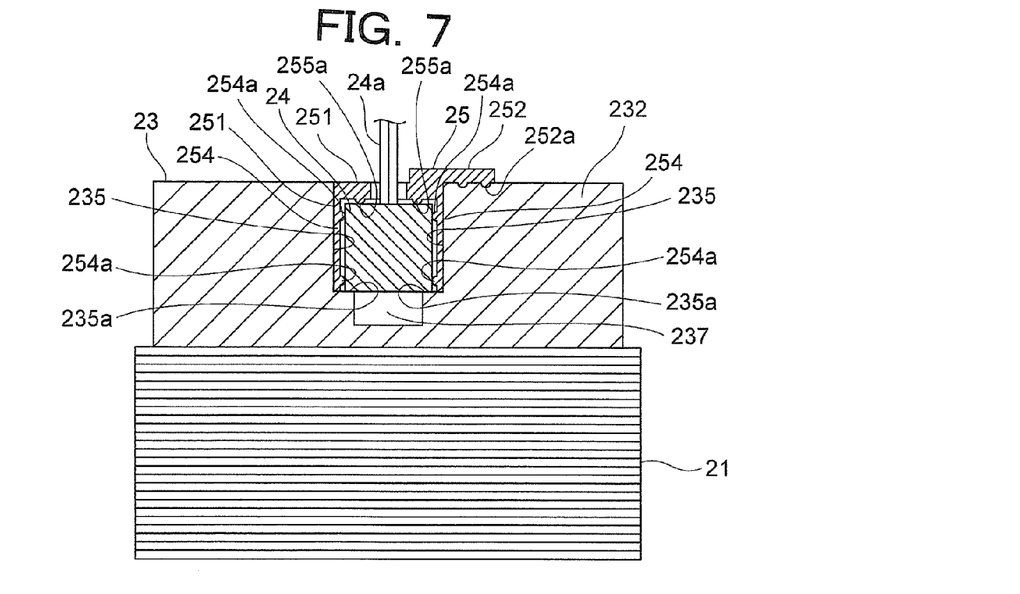
FIG. 7 is a cross section that is taken along Line VII-VII in FIG. 4.
Figure 8:
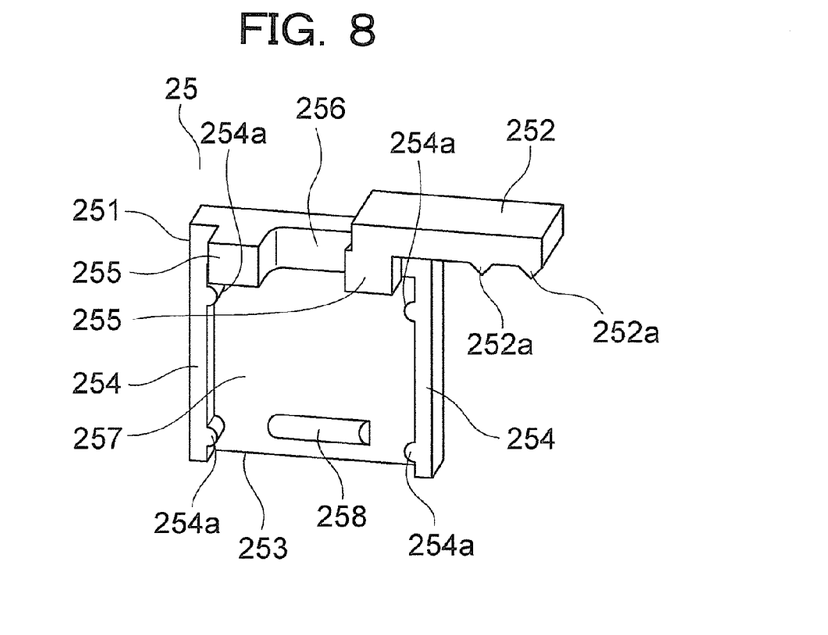
FIG. 8 is an oblique projection that shows a holder from FIG. 4.
Figure 9:
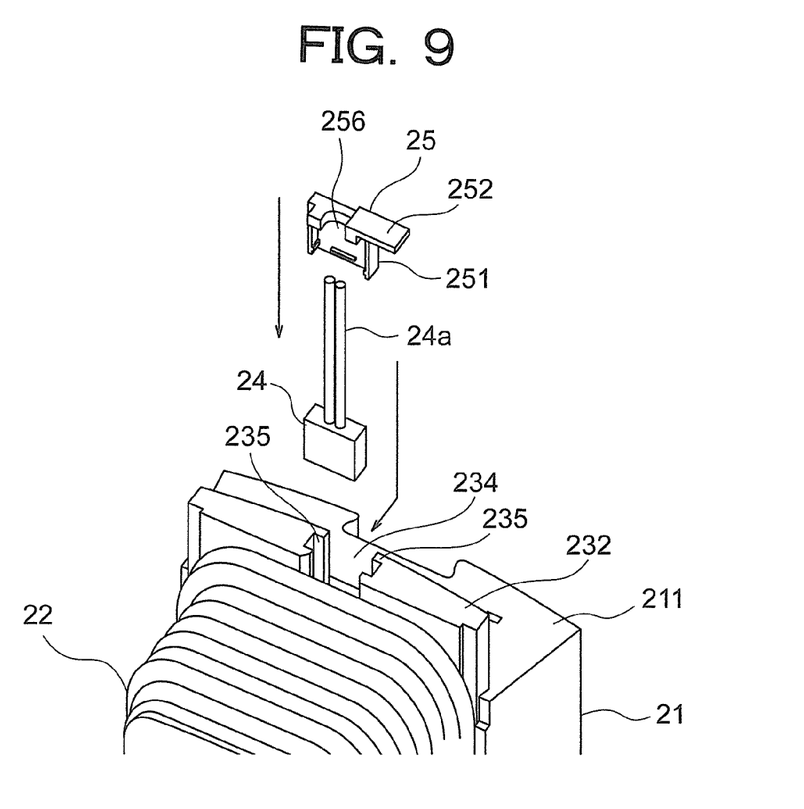
FIG. 9 is an exploded oblique projection that shows a state in which a temperature sensor and the holder from FIG. 4 are removed from the insulator.

FIG. 7 is a cross section that is taken along Line VII-VII in FIG. 4. FIG. 8 is an oblique projection that shows the holder 25 from FIG. 4. In addition, FIG. 9 is an exploded oblique projection that shows a state in which a temperature sensor 24 and the holder 25 from FIG. 4 are removed from the insulator 23. The holder 25 has: a holder main body 251 that is disposed in the notch portion 234; and a holder fixing portion 252 that is disposed on the holder main body 251, and that is attached to the flange protruding portion 232*a*. The holder 25 is a separate member from the insulator 23.

The holder 25 is mounted onto the flange protruding portion 232*a* such that portions of the holder main body 251 are fitted into each of the interfitting grooves 235. The temperature sensor 24 is covered by the holder main body 251 and the insulator 23 when in contact with the stator coil 22.

The holder main body 251 has: a bracing portion 253 that is disposed between the pair of interfitting grooves 235; a pair of interfitting wall portions 254 that are disposed on two end portions in a width direction of the bracing portion 253, and that respectively fit slidably into the interfitting grooves 235; and a pair of cover portions 255 that are disposed on the bracing portion 253, and that are disposed in the open portion of the notch portion 234.

The position of the holder 25 relative to the flange protruding portion 232*a* is restricted in every direction except a depth direction of the notch portion 234 (in this example, the axial direction of the stator core 21) by fitting the respective interfitting wall portions 254 into each of the interfitting grooves 235. As shown in FIG. 3, the temperature sensor 24 is held in the radial direction of the stator core 21 between the bracing portion 253 of the holder main body 251 and the stator coil 22.

As shown in FIG. 8, the bracing portion 253 has: a backing plate 257 that is disposed parallel to the depth direction and the width direction of the notch portion 234; and an elastic portion 258 that is disposed on the backing plate 257 so as to constitute a projection that contacts the temperature sensor 24. A thickness dimension of the backing plate 257 is smaller than a width dimension of each of the interfitting grooves 235.

The elastic portion 258 is disposed so as to be parallel to the width direction of the bracing portion 253 at a position that is separated from the cover portions 255. The elastic portion 258 is constituted by an elastic material (rubber, for example). When the holder 25 is mounted onto the flange protruding portion 232*a*, and the temperature sensor 24 is held between the bracing portion 253 and the stator coil 22, the elastic portion 258 is deformed elastically between the temperature sensor 24 and the backing plate 257, as shown in FIG. 3. Thus, the elastic portion 258 generates an elastic force of recovery that pushes the temperature sensor 24 against the stator coil 22. The holder 25 is constituted by an electrically-insulating material. In this example, portions of the holder 25 other than the elastic portion 258 are made of a resin, and the elastic portion 258 is made of a rubber.

Each of the interfitting wall portions 254 is disposed so as to be parallel to the interfitting grooves 235. Furthermore, each of the interfitting wall portions 254 protrudes toward the stator coil 22 from the backing plate 257 so as to match the width dimensions of the interfitting grooves 235. As shown in FIG. 7, the temperature sensor 24 is held between the pair of interfitting wall portions 254 in the width direction of the notch portion 234. The position of the temperature sensor 24 relative to the flange protruding portion 232a is restricted in the width direction of the notch portion 234 by holding the temperature sensor 24 using the pair of interfitting wall portions 254.

Each of the interfitting wall portions 254 respectively has a plurality of projections 254a that contact the temperature sensor 24. Thus, each of the interfitting wall portions 254 partially contacts the temperature sensor 24. In this example, the interfitting wall portions 254 each have two projections 254a.

Each of the cover portions 255 protrudes toward the stator coil 22 from the backing plate 257. A recess portion 256 that allows passage of the lead wires 24a of the temperature sensor 24 is formed between the cover portions 255. As shown in FIG. 7, the temperature sensor 24 is held between each of the groove end surfaces 235a and each of the cover portions 255 in the depth direction of the notch portion 234. The temperature sensor 24 is thereby prevented from dislodging through the open portion of the notch portion 234.

Each of the cover portions 255 respectively has a projection 255a that contacts the temperature sensor 24. Thus, each of the cover portions 255 partially contacts the temperature sensor 24.

The holder fixing portion 252 is disposed on one of the cover portions 255 of the holder main body 251. The holder fixing portion 252 protrudes outward in a width direction of the holder main body 251. The holder fixing portion 252 thereby overlaps with an outer circumferential surface of the flange protruding portion 232a. Specifically, the holder fixing portion 252 overlaps with the flange protruding portion 232a in a direction in which the interfitting wall portions 254 slide along the interfitting grooves 235.

The holder fixing portion 252 has a plurality of (in this example, two) welding projections 252a that face the outer circumferential surface of the flange protruding portion 232a. The holder fixing portion 252 is welded onto the outer circumferential surface of the flange protruding portion 232a by melting and solidifying each of the welding projections 252a and the flange protruding portion 232a with each of the welding projections 252a placed in contact with the outer circumferential surface of the flange protruding portion 232a. In this example, in order to make the welding between the holder fixing portion 252 and the flange protruding portion 232a more reliable, a material that constitutes the holder fixing portion 252 is a resin that is similar or identical to the material that constitutes the flange protruding portion 232a. The position of the holder 25 relative to the flange protruding portion 232a is restricted in the depth direction of the notch portion 234 by the holder fixing portion 252 being fixed to the flange protruding portion 232a by the welding.

As shown in FIG. 3, the temperature sensor 24 contacts the conducting wire 221 of a coil end portion 22a of the stator coil 22 through the notch portion 234. Thus, the temperature sensor 24 and the stator coil 22 are in partial contact with each other, and gaps arise partially between the temperature sensor 24 and the stator coil 22. The temperature sensor 24 is pressed against the stator coil 22 by the elastic force of recovery of the elastic portion 258. A state of contact between the temperature sensor 24 and the stator coil 22 is thereby ensured.

As shown in FIG. 3, the gaps that arise between the temperature sensor 24 and the stator coil 22 are filled with a paste filler 222 that has thermal conductivity and electrical insulation. A resin, for example, is used as a material for the filler 222.

Next, a manufacturing method for the rotary electric machine 1 will be explained. When manufacturing the rotary electric machine 1, the rotor 3 and the rotating shaft 6 are integrated in advance by fixing the rotor 3 onto the rotating shaft 6, and the stator 2 is also fixed inside the first housing portion 41 in advance. Next, the rotor 3 is inserted inside the stator 2 together with the rotating shaft 6, and then the first and second housing portions 41 and 42 are assembled to constitute the housing 4. The rotary electric machine 1 is manufactured in this manner.

Next, a manufacturing method for the stator 2 will be explained. When manufacturing the stator 2, two insulators 23 are first mounted onto each of the teeth 212 of the stator core 21. At this point, the trunk portion 231 of each of the insulators 23 is fitted onto a tooth 212 such that a position of the first flange portion 232 is further outward than a position of the second flange portion 233 in the radial direction of the stator core 21. Furthermore, at this point, the flange protruding portion 232a on which the notch portion 234 is disposed is placed so as to protrude from the stator core 21 in the axial direction of the stator core 21.

Next, the conducting wires 221 are wound onto the teeth 212 from outside each of the trunk portions 231. The stator coils 22 are thereby respectively disposed on each of the teeth 212 so as to have the trunk portions 231 interposed. Here, the conducting wires 221 are pressed against the trunk portion 231, the first flange portion 232, and the second flange portion 233 as the conducting wires 221 are wound onto the teeth 212. The stator coils 22 are thereby disposed on the insulators 23 in a state of contact with each of the trunk portion 231, the first flange portion 232, and the second flange portion 233, and the position of the stator coils 22 relative to the insulators 23 is fixed (a winding step).

After the winding step, the temperature sensor 24 is inserted into the notch portion 234 that is disposed on the flange protruding portion 232a, as shown in FIG. 9. Here, the paste filler 222 is interposed between the temperature sensor 24 and the stator coils 22 by applying the filler 222 (FIG. 3) to at least one of the temperature sensor 24 and the stator coils 22 in advance. At this point, the temperature sensor 24 is also disposed in the notch portion 234 such that the temperature sensor 24 is engaged in each of the groove end surfaces 235a (a temperature sensor inserting step).

After the temperature sensor inserting step, the holder main body 251 is inserted into the notch portion 234 through the open portion of the notch portion 234, as shown in FIG. 9. The temperature sensor 24 is thereby held between the stator coil 22 and the holder main body 251. At this point, each of the interfitting wall portions 254 is fitted into each of the interfitting grooves 235 such that the temperature sensor 24 is sandwiched between each of the interfitting wall portions 254 in the width direction of the notch portion 234, and the elastic portion 258 is elastically deformed between the backing plate 257 and the temperature sensor 24 as the interfitting wall portions 254 are slid along the interfitting grooves 235. The elastic portion 258 thereby generates an elastic force of recovery, and the temperature sensor 24 is pressed against the stator coil 22 by the elastic force of recovery of the elastic portion 258. The holder main body 251 is inserted into the notch portion 234 until each of the welding projections 252a of the holder fixing portion 252 contacts the outer circumferential surface of the flange protruding portion 232a.

Next, while the temperature sensor 24 is held between the stator coil 22 and the holder main body 251, portions of contact each of the welding projections 252a and the flange protruding portion 232a are heated, welding the holder fixing portion 252 onto the flange protruding portion 232a by melting and solidifying each of the welding projections 252a and the flange protruding portion 232a. The holder 25 is thereby mounted onto the flange protruding portion 232a (a holder mounting step).

After the holder mounting step, the varnish is supplied to the stator coils 22 through the communicating spaces 237 and the varnish supplying grooves 236. The varnish is thereby impregnated into the stator coils 22 such that the stator coils 22 and the insulators 23, and the conducting wires 221 of the stator coils 22, are fixed by the varnish (a varnish supplying step). The stator 2 is manufactured in this manner.

In a stator 2 of this kind, and in a rotary electric machine 1 that includes the stator 2, because a notch portion 234 is disposed on a flange protruding portion 232a, which is a portion of a first flange portion 232 that protrudes from a stator core 21 in an axial direction of the stator core 21, toward a trunk portion 231 from an outer circumferential portion of the flange protruding portion 232a, and a temperature sensor 24 is held between a holder main body 251 that is disposed in the notch portion 234 and a stator coil 22, the temperature sensor 24 can be disposed outside an axial range of the stator core 21. The temperature sensor 24 can thereby be disposed so as to avoid space in which the stator coils 22 should be disposed, enabling reductions in the space factor of the stator coils 22 to be prevented. Because the temperature sensor 24 can be disposed in the notch portion 234 of the flange protruding portion 232a when the stator coils 22 are disposed on the insulators 23, adjustment of the state of contact of the temperature sensor 24 on the stator coil 22 can be facilitated even if there are irregularities in the wire diameter of the conducting wire 221 of the stator coil 22 and the arrangement of the stator coil 22, etc., enabling the temperature sensor 24 to be placed in contact with the stator coil 22 more reliably.

In addition, because the temperature sensor 24 that is disposed in the notch portion 234 has extra space when the holder main body 251 is removed from the notch portion 234, the temperature sensor 24 can be placed in contact with the stator coil 22 from a vertical direction. Thus, the temperature sensor 24 can be prevented from rubbing against the stator coil 22 when installing the temperature sensor 24, enabling the occurrence of problems due to the temperature sensor 24 and the stator coil 22 rubbing together to be prevented. Examples of problems due to the temperature sensor 24 and the stator coil 22 rubbing together include: at least one of the insulating coating of the conducting wire 221 of the stator coil 22 and the temperature sensor 24 being damaged, or the filler 222 being scraped off by the temperature sensor 24 when the filler 222 is interposed between the temperature sensor 24 and the stator coil 22, for example.

Because the temperature sensor 24 is removed from the insulator 23 by removing the holder 25 from the insulator 23, the operation of removing, and the operation of remounting, the temperature sensor 24 and the holder 25 from and to the insulator 23 can be performed easily without damaging the temperature sensor 24 or the stator coil 22.

Because a pair of interfitting grooves 235 into which interfitting wall portions 254, which are portions of the holder main body 251, fit slidably are disposed on inner surfaces of the notch portion 234 so as to face each other in the width direction of the notch portion 234, among the loads that act on the temperature sensor 24 during use of the stator 2, loads other than a load in a direction that is parallel to the interfitting grooves 235 can be made to be borne by the inner surfaces of the interfitting grooves 235 (the flange protruding portion 232a). The holder main body 251 can thereby be made less likely to dislodge from the insulator 23, enabling improvements in reliability of the mounted state of the temperature sensor 24 and the holder 25 to be achieved.

Because a communicating space 237 that passes through the flange protruding portion 232a in a thickness direction of the first flange portion 232 is disposed at a boundary between the trunk portion 231 and the flange protruding portion 232a, and a varnish supplying groove 236 that is disposed on an outer circumferential surface of the trunk portion 231 and the notch portion 234 are each connected to the communicating space 237, varnish can be injected into the stator coil 22 through the varnish supplying groove 236 from the communicating space 237 that is connected to the notch portion 234. The communicating space 237 can thereby be formed on the flange protruding portion 232a as an integrated space that is continuous with the notch portion 234, eliminating the need to dispose a penetrating aperture especially for injecting the varnish inside the stator coil 22 separately on the insulator 23. Consequently, simplification of shape and a reduction in size of the insulator 23 can be achieved.

Because a holder fixing portion 252 is welded onto the flange protruding portion 232a by fusing welding projections 252a, the need to ensure space for mechanical fastening by a screw, etc., is eliminated, enabling a range in which the holder fixing portion 252 is fixed onto the flange protruding portion 232a to be reduced. The construction for mounting the holder fixing portion 252 onto the flange protruding portion 232a can thereby be made compact. Compared to when the holder fixing portion 252 is fixed to the flange protruding portion 232a by an adhesive, thermal characteristics in the vicinity of the temperature sensor 24 can be prevented from becoming irregular due to unexpected heat pathways occurring as a result of excess adhesive adhering to unexpected positions, enabling the precision of temperature detection by the temperature sensor 24 to be improved. In addition, burdens on production, such as management of the adhesive, can also be alleviated.

Because the holder fixing portion 252 overlaps with the flange protruding portion 232a in a direction in which the interfitting wall portions 254 slide along the interfitting grooves 235, the holder main body 251 can be held on inner surfaces of the interfitting grooves 235 in directions other than a direction that is parallel to the interfitting grooves 235, enabling the fixing strength of the holder fixing portion 252 on the flange protruding portion 232a to be determined by allowing only for tensile load in the direction that is parallel to the interfitting grooves 235. Thus, even if the construction for mounting the holder fixing portion 252 onto the flange protruding portion 232a is made compact, the fixing strength of the holder fixing portion 252 on the flange protruding portion 232a can be sufficiently ensured.

Because the temperature sensor 24 is covered by the insulator 23 and the holder 25 when in contact with the stator coil 22, the temperature sensor 24 can be prevented from being exposed to the refrigerant that flows through the rotary electric machine 1. Noise due to unstable cooling of the temperature sensor 24 by the refrigerant can thereby be suppressed, enabling precision of temperature detection by the temperature sensor 24 to be further improved.

Because the holder main body 251 has a plurality of projections 254a, 255a, and 257 that contact the temperature sensor 24, the contact area of the holder main body 251 on the temperature sensor 24 can be reduced. Thermal conduction from the temperature sensor 24 to the holder 25 can thereby be suppressed, enabling thermal leakage from the temperature sensor 24 to be reduced. Consequently, precision of temperature detection by the temperature sensor 24 can be further improved.

Because the holder main body 251 has an elastic portion 258 that generates an elastic force of recovery that pushes the temperature sensor 24 against the stator coil 22, the temperature sensor 24 can be placed in contact with the stator coil 22 more reliably. Thermal resistance between the temperature sensor 24 and the stator coil 22 can thereby be lowered, enabling precision of temperature detection by the temperature sensor 24 to be further improved.

Because gaps that arise between the temperature sensor 24 and the stator coil 22, which are in partial contact with each other, are filled with a filler 222 that has electrical insulation and thermal conductivity, thermal resistance between the temperature sensor 24 and the stator coil 22 can be further lowered by the filler 222. Precision of temperature detection by the temperature sensor 24 can thereby be further improved.

In a manufacturing method for a stator 2 of a rotary electric machine 1 of this kind, because the stator coils 22 are disposed on the teeth 212 so as to have the trunk portions 231 of the insulators 23 interposed, and then the temperature sensor 24 is inserted into the notch portion 234 that is disposed on a flange protruding portion 232a that protrudes from the stator core 21, and then the holder main body 251 is inserted into the notch portion 234 to hold the temperature sensor 24 between a stator coil 22 and the holder main body 251, the temperature sensor 24 can be inserted into the notch portion 234 with the stator coils 22 disposed on the insulators 23. Adjustment of the state of contact of the temperature sensor 24 on the stator coil 22 can thereby be facilitated, enabling the temperature sensor 24 to be placed in contact with the stator coil 22 more reliably. Because the temperature sensor 24 has extra space after the temperature sensor 24 is inserted into the notch portion 234 before the holder main body 251 is inserted into the notch portion 234, and at that point, the temperature sensor 24 can be placed in contact with the stator coils 22 through the notch portion 234, the temperature sensor 24 can be prevented from rubbing against the stator coil 22, enabling the occurrence of problems due to the temperature sensor 24 and the stator coil 22 rubbing together to be prevented. In addition, because the temperature sensor 24 is inserted into the notch portion 234 that is disposed on the flange protruding portion 232a that protrudes from the stator core 21, the temperature sensor 24 can be disposed so as to avoid a space in which the stator coils 22 should be disposed, enabling reductions in the space factor of the stator coils 22 to be prevented.

Because interfitting wall portions 254 that are part of the holder main body 251 are fitted into and slide on the pair of interfitting grooves 235 that are disposed on the inner surface of the notch portion 234 when the holder main body 251 is inserted into the notch portion 234, insertion of the holder main body 251 into the notch portion 234 can be facilitated, and the holder main body 251 can also be made less likely to dislodge from the insulator 23.

Because a filler 222 is interposed between the temperature sensor 24 and the stator coil 22 when the temperature sensor 24 is inserted into the notch portion 234, gaps between the temperature sensor 24 and the stator coils 22 can be filled more reliably and easily with the filler 222.

Because varnish is supplied to the stator coil 22 through a communicating space 237 and a varnish supplying groove 236 after the holder 25 is fixed to the flange protruding portion 232a, supplying of the varnish to the stator coils 22 can be performed more reliably and easily.

Moreover, in the above example, the holder 25 has an elastic portion 258 that generates an elastic force of recovery that pushes the temperature sensor 24 against the stator coil 22, but it is not necessary to impart the elastic portion 258 with a function of generating an elastic force of recovery if the state of contact of the temperature sensor 24 with the stator coil 22 is ensured by the elastic force of recovery of the stator coil 22, for example, and the bracing portion 253 that includes the backing plate 257 and the elastic portion 258 may be a single member that is constituted by a resin, for example.

Embodiment 2

Figure 10:
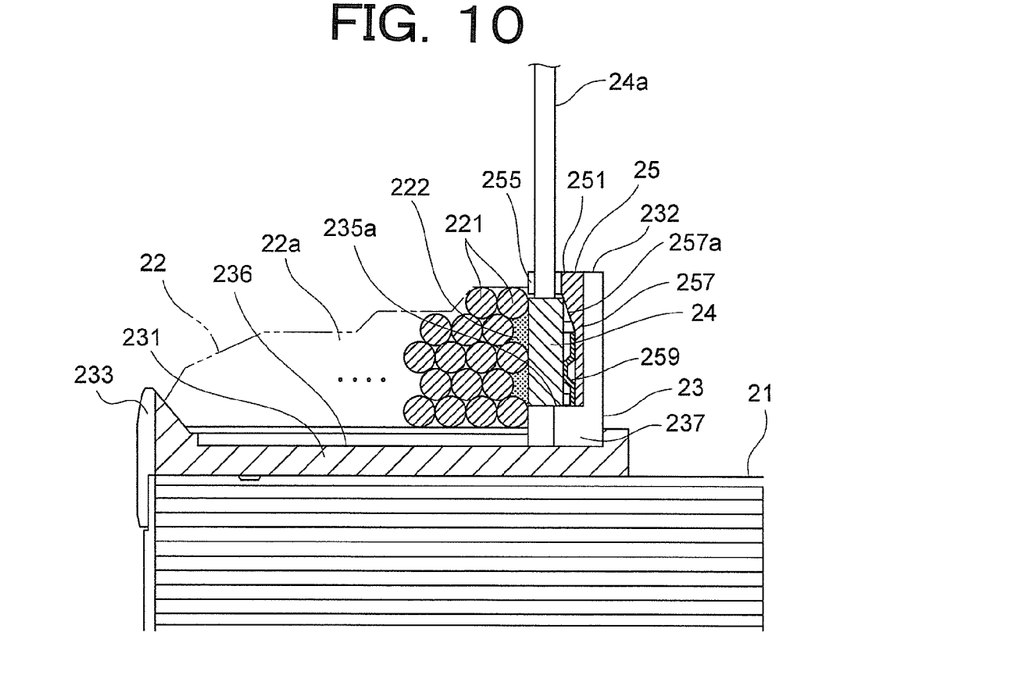
FIG. 10 is an enlarged cross section that shows part of a rotary electric machine stator according to Embodiment 2 of the present invention.
Figure 11:
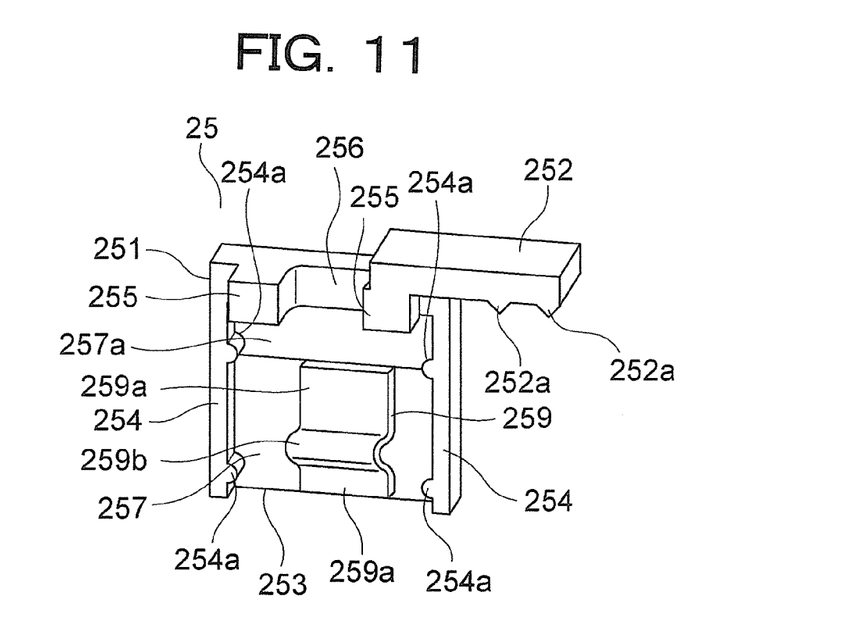
FIG. 11 is an oblique projection that shows a holder from FIG. 10.

FIG. 10 is an enlarged cross section that shows part of a rotary electric machine stator according to Embodiment 2 of the present invention. FIG. 11 is an oblique projection that shows a holder 25 from FIG. 10. Moreover, FIG. 10 is a figure that corresponds to FIG. 3 in Embodiment 1, and FIG. 11 is a figure that corresponds to FIG. 8 in Embodiment 1. A holder 25 has: a holder main body 251 that is disposed in a notch portion 234; and a holder fixing portion 252 that is disposed on the holder main body 251, and that is fixed to a flange protruding portion 232a.

The holder main body 251 has: a bracing portion 253 that is disposed between a pair of interfitting grooves 235; a pair of interfitting wall portions 254 that are disposed on two end portions in a width direction of the bracing portion 253, and that respectively fit slidably into the interfitting grooves 235; and a pair of cover portions 255 that are disposed on the bracing portion 253, and that are disposed in the open portion of the notch portion 234. Configuration of portions of the holder 25 other than the bracing portion 253 is similar or identical to the configuration of the holder 25 in Embodiment 1.

The bracing portion 253 has: a backing plate 257 that is disposed parallel to a depth direction and a width direction of the notch portion 234; and an elastic portion 259 that is disposed on the backing plate 257 so as to be separated from the cover portions 255 so as to constitute a projection that contacts a temperature sensor 24.

A backing plate inclined surface 257a that is inclined toward the temperature sensor 24 in a direction that approaches the cover portions 255 is formed on a portion of the backing plate 257 that is close to the cover portion 255. An upper portion of the temperature sensor 24 (a portion that is close to the cover portions 255) is pressed by the backing plate inclined surface 257a so as not to separate from a stator coil 22.

A material that constitutes the elastic portion 259 is a metal. In this example, the elastic portion 259 is a metal leaf spring. The elastic portion 259 is disposed on the backing plate 257 so as to avoid the backing plate inclined surface 257a. In addition, the elastic portion 259 has: a pair of mounting portions 259a that are mounted onto the backing plate 257; and a curved portion 259b that is disposed between the pair of mounting portions 259a, and that is curved so as to protrude on a side near the temperature sensor 24. The curved portion 259b generates an elastic force of recovery that presses the temperature sensor 24 against the stator coil 22 by being elastically deformed between the backing plate 257 and the temperature sensor 24. The rest of the configuration is similar or identical to that of Embodiment 1.

In a stator 2 of this kind, and in a rotary electric machine 1 that includes the stator 2, because a backing plate inclined surface 257a that is inclined toward a temperature sensor 24 in a direction that approaches cover portions 255 is formed on a backing plate 257, the temperature sensor 24 is pressed by the backing plate inclined surface 257a so as not to separate from a stator coil 22, enabling the state of contact of the temperature sensor 24 on the stator coil 22 to be made even more stable.

Because a material that constitutes the elastic portion 259 is a metal, durability of the elastic portion 259 can be improved, enabling reductions in the elastic force of recovery of the elastic portion 259 to be suppressed for extended periods. Extension of service life of the holder 25 is thereby enabled, enabling a state in which the temperature sensor 24 contacts to the stator coils 22 stably to be ensured for extended periods.

Moreover, in the above example, a backing plate inclined surface 257a is formed on the backing plate 257, but the backing plate inclined surface 257a may be omitted. Furthermore, the backing plate inclined surface 257a in the above example may be formed on the backing plate 257 according to Embodiment 1.

In each of the above embodiments, the holder fixing portion 252 is welded onto the outer circumferential surface of the flange protruding portion 232a, but the method for fixing the holder fixing portion 252 onto the flange protruding portion 232a is not limited thereto. The holder fixing portion 252 may be fixed to the flange protruding portion 232a by an adhesive or a screw, for example.

In each of the above embodiments, the holder 25 has a holder fixing portion 252, but the holder fixing portion 252 may be omitted if the holder main body 251 is held on the notch portion 234 by fixing the holder main body 251 to the inner surface of the notch portion 234 directly using an adhesive, for example.

In each of the above embodiments, a pair of interfitting grooves 235 into which portions of the holder main body 251 fit slidably are disposed on inner surfaces of the notch portion 234, but the pair of interfitting grooves 235 may be omitted provided that the holder main body 251 is held on the notch portion 234.

In each of the above embodiments, interfitting grooves 235 are disposed on an inner surface of the notch portion 234 as interfitting portions into which portions of the holder main body 251 fit slidably, but a pair of interfitting protrusions may be disposed as interfitting portions on an inner surface of the notch portion 234. In that case, the pair of interfitting protrusions are disposed so as to face each other in a width direction of the notch portion 234, and so as to be parallel to a depth direction of the notch portion 234. In that case, recess portions that fit slidably onto each of the interfitting protrusions are also disposed on each of the interfitting wall portions 254 of the holder main body 251.

In each of the above embodiments, the filler 222 that fills the gaps between the stator coil 22 and the temperature sensor 24 is different than a glue that is supplied to the stator coils 22, but the glue that is supplied to the stator coils 22 may be used as the filler 222 by spreading the glue to the gaps between the stator coil 22 and the temperature sensor 24.

In each of the above embodiments, the present invention is applied to an inner-rotor rotary electric machine 1 in which a rotor 3 is disposed inside a tubular stator 2, but the present invention may be applied to an outer-rotor rotary electric machine in which a stator is disposed inside a tubular rotor. In that case, each of the teeth of the stator core protrudes radially outward from a core back toward the tubular rotor. In that case, the flange protruding portion of the first flange portion on which the notch portion is disposed is disposed on a radially inner side that is closer to the core back than the second flange portion.

What is claimed is:

1. A rotary electric machine stator comprising:
    a stator core that includes:
    a core back; and
    a tooth that protrudes in a radial direction from the core back;
    a stator coil that is disposed on the tooth;
    an insulator that includes:
    a trunk portion that is interposed between the tooth and the stator coil; and
    a flange portion that is disposed on the trunk portion so as to be adjacent to the stator coil in a radial direction of the stator core,
    a notch portion being disposed on a flange protruding portion toward the trunk portion from an outer circumferential portion of the flange protruding portion, the flange protruding portion being a portion of the flange portion that protrudes from the stator core in an axial direction of the stator core;
        a holder that is mounted onto the flange protruding portion, the holder including a holder main body that is disposed in the notch portion; and
        a temperature sensor that is held between the holder main body and the stator coil,
        wherein a pair of interfitting portions are disposed on an inner surface of the notch portion and face each other in a width direction of the notch portion,
        wherein a portion of the holder main body fits slidably and is inserted into the pair of interfitting portions, and the temperature sensor is inserted between the pair of interfitting portions.

2. A rotary electric machine stator according to claim 1, wherein:
    a communicating space that passes through the flange protruding portion in a thickness direction of the flange portion is disposed at a boundary between the flange protruding portion and the trunk portion; and
    a varnish supplying groove that is disposed on an outer circumferential surface of the trunk portion and the notch portion are each connected to the communicating space.

3. A rotary electric machine stator according to claim 1, wherein:
    the holder includes a holder fixing portion that is disposed on the holder main body;
    the holder fixing portion includes a welding projection; and
    the holder is mounted onto the flange protruding portion such that the holder fixing portion is welded to the flange protruding portion by fusing the welding projection.

4. A rotary electric machine stator according to claim 1, wherein the temperature sensor is covered by the insulator and the holder in a state of contact with the stator coil.

5. A rotary electric machine stator according to claim 1, wherein the holder main body includes a plurality of projections that contact the temperature sensor.

6. A rotary electric machine stator according to claim 1, wherein the holder main body includes an elastic portion that generates an elastic force of recovery that pushes the temperature sensor against the stator coil.

7. A rotary electric machine stator according to claim 1, wherein:
   the temperature sensor and the stator coil are in partial contact with each other; and
   gaps that arise between the temperature sensor and the stator coil are filled with a filler that has electrical insulation and thermal conductivity.

8. A rotary electric machine comprising:
   a rotor; and
   a stator according to claim 1, that faces the rotor in a radial direction.

* * * * *